(12) United States Patent
Jin

(10) Patent No.: US 7,062,721 B2
(45) Date of Patent: *Jun. 13, 2006

(54) GRAPHICAL USER INTERFACE WITH IMPROVED CONTROL FOR AREAS WITH A LARGE NUMBER OF SELECTABLE BITMAPS

(75) Inventor: Ye Jin, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 631 days.

This patent is subject to a terminal disclaimer.

(21) Appl. No.: 10/284,352

(22) Filed: Oct. 31, 2002

(65) Prior Publication Data

US 2003/0058285 A1    Mar. 27, 2003

Related U.S. Application Data

(63) Continuation of application No. 09/379,787, filed on Aug. 24, 1999, now Pat. No. 6,480,209.

(51) Int. Cl.
*G06F 3/00* (2006.01)

(52) U.S. Cl. ............... 715/843; 715/810; 715/835; 715/823

(58) Field of Classification Search ........... 715/843, 715/810, 835, 823
See application file for complete search history.

(56) References Cited

U.S. PATENT DOCUMENTS 6,121,966 A *  9/2000  Teodosio et al. ........... 715/838
6,229,539 B1*  5/2001  Morcos et al. .............. 715/808

* cited by examiner

*Primary Examiner*—Kieu D. Vu
(74) *Attorney, Agent, or Firm*—Oblon, Spivak, McClelland, Maier & Neustadt, P.C.

(57) ABSTRACT

A graphical user interface which can aid in the selection of, and the confirmation of the selection of, a plurality of selectable controls, represented as selectable bitmaps, which are closely displayed together. A graphical user interface includes a graphical representation in bitmap format of a plurality of selectable bitmap portions. At least one designated group of the plurality of selectable bitmap portions is corresponded to a single drop-down or combo box. An indicator can select one selectable bitmap portion from the plurality of selectable bitmap portions of the designated group. An indication is then provided in the drop-down or combo box of the selected bitmap portion when the selected bitmap portion is part of the designated group. The indication in the drop-down or combo box is also changed as a selected bitmap portion changes within the designated group.

48 Claims, 3 Drawing Sheets

GRAPHICAL USER INTERFACE WITH IMPROVED CONTROL FOR AREAS WITH A LARGE NUMBER OF SELECTABLE BITMAPS

CROSS-REFERENCE TO RELATED APPLICATIONS

The present application is a continuation of U.S. application Ser. No. 09/379,787filed on Aug. 24, 1999, now U.S. Pat. No. 6,480,209.

BACKGROUND OF THE INVENTION

1. Field of the Invention

The present invention is directed to a graphical user interface which makes its easier for an operator to select a bitmap on the graphical user interface, and more particularly when several selectable bitmaps are included in a small area.

2. Discussion of the Background

FIG. 1 shows a representation of a network system which can be used in an office type environment and in which a plurality of personal computers 25, 30 are connected to a network 10. A plurality of printers can also be connected to the network 10. FIG. 1 shows one printer 15 connected to the network 10, although clearly other printers, copiers, facsimiles, multi-function devices, etc. could also be connected to the network 10. A printer can also be connected to just one personal computer, see for example printer 20 connected to personal computer 25 in FIG. 1.

In such a system as shown in FIG. 1, a plurality of operators at the personal computers 25, 30 can provide instructions to print a document at any of the printers connected to the network 10, such as printer 15. The user of personal computer 25 can also instruct a printing operation to the local printer 20 connected just thereto.

In the system shown in FIG. 1, the personal computer 25 includes a printer driver 35. The printer driver 35 provides a control for controlling at least the printer 20. Each personal computer connected to the network 10 may include its own printer driver.

The personal computers 25, 30 control the printing of documents to the printers available thereto through printer drivers, such as the printer driver 35, which are displayed on displays (not shown) of the personal computers 25, 30 by a graphical user interface. A graphical user interface is an interface which appears on the display of a personal computer, such as personal computers 25, 30 in FIG. 1. An operator can control the operations of a printer and the output of documents to a printer through the graphical user interface. For example, when the graphical user interface appears on the display of the personal computer 25, 30, an operator can select a function on the graphical user interface by changing the position of a pointer by, e.g., utilizing a mouse (not shown) and "clicking on" a desired function. Any other manner of selecting an operation on the graphical user interface can also be selected including utilizing a keyboard, etc.

FIG. 2 shows one screen of a graphical user interface utilized by the printer driver 35 of FIG. 1. FIG. 2 shows a screen 50 of a graphical user interface which may appear on a display of a personal computer connected to the network 10, such as personal computer 25 of FIG. 1. The graphical user interface screen 50 of FIG. 2 includes a graphical representation 55 of a printer, which is a bitmap image, representing one of printers 15, 20 of FIG. 1. An indicator 60 is also provided. Indicator 60 may typically be a pointer which can be manipulated by a mouse and which allows an operator to "click on" functions of the graphical representation 55 of the printer. The functions which an operator can "click on" include selectable bitmaps of the graphical representation 55, and other controls on the screen 50.

The graphical user interface screen 50 of FIG. 2 also includes different menus 80 which can be selected by an operator, different control boxes 65 and 75, a combo box 71, and radio buttons 70. The control boxes 65 and 75 are controls which an operator can "click on" by moving the indicator 60 and manipulating the mouse. The control boxes 65 may include controls such as "OK", "CANCEL", "HELP", etc. The control boxes 75 may be boxes to control the display, such as to minimize and maximize the size of the display, etc. The graphical user interface screen 50 of FIG. 2 also includes the radio buttons 70 which an operator can also "click on". The radio buttons 70 may indicate different printing operations or different elements of the printer to be selected. Text describing what each of the radio buttons 70 represents will be positioned next to the radio buttons 70. This text is not shown in FIG. 2 for clarity. The control buttons 65 and 75 and the menu 80 also will have text indicating their functions, which also have not been shown in FIG. 2 for clarity.

An example of how an operator utilizes the graphical user interface screen 50 of FIG. 2 is now further explained.

The graphical user interface has many menu pages 80 with different controls thereon. In the menu page shown in FIG. 2, which includes the graphical representation 55 of the printer, an operator may, as an example, select an output tray 61 or 62 to which a printed document is to be output. For example, the operator may move the indicator 60 to one of the output trays 61 and 62 by manipulating the mouse, and then "click on" one of the output trays 61 or 62, to thereby select on which output tray a printed document is to be output. Typically, the selected output tray 61 or 62 is then indicated as selected by a different shading, highlighting, etc. on the graphical user interface screen 50.

As a further example, the printer may include a plurality of mailbox or proof trays, shown as elements $63_1$–$63_9$ in FIG. 2, formed in a mailbox tray area 63. In the specific example shown in FIG. 2, the printer includes nine mailbox trays $63_1$–$63_9$ in the mailbox tray area 63. The operator can select a mailbox tray from the mailbox tray area 63 by again moving the indicator 60 to the appropriate mailbox tray and "clicking on" the selected mailbox tray.

As also shown in FIG. 2, the graphical user interface screen 50 includes the combo box 71. The combo box 71 corresponds to the mailbox tray area 63. More particularly, if an operator clicks on the combo box 71 a drop-down box may then be displayed with items corresponding to the different mailbox or proof trays in the mailbox tray area 63.

However, the graphical user interface as shown in FIG. 2 suffers from a significant drawback in this type of operation.

Printers are becoming more and more complicated and have more and more functions. As a result, a graphical bitmap representation of a printer is becoming more and more complicated, and includes a large number of selectable bitmaps which an operator can select, e.g., "click on". As a result, it is becoming more and more difficult for an operator to clearly indicate what function he or she is selecting on the graphical user interface. In the example noted above, the printer includes nine mailbox trays $63_1$–$63_9$ in the mailbox tray area 63. In this situation, it is difficult for the operator to properly select one of the mailbox trays since the mailbox trays in the mailbox tray area 63 are so closely displayed together.

A further drawback with such a graphical user interface of FIG. 2 is that even after an operator selects one of the mailbox trays $63_1$–$63_9$ in the mailbox tray area 63, and the selected mailbox tray is highlighted or shaded, because the different mailbox trays in the mailbox tray area 63 are closely displayed together, it may be difficult for the operator to see the shading or highlighting of the selected mailbox tray to confirm the operators selection.

As devices to be controlled by graphical user interfaces become more and more complex, this situation will arise in several instances in which several functions which can be selected by an operator are closely bunched together, making it more difficult for an operator to select, and confirm a selection of, a desired function.

SUMMARY OF THE INVENTION

Accordingly, one object of the present invention is to provide a novel graphical user interface and controller which can overcome the above-noted and other drawbacks in the background art.

A more specific object of the present invention is to provide a novel graphical user interface and controller which can aid in the selection of, and the confirmation of the selection of, a plurality of selectable functions which are closely displayed together.

To achieve these and other objects, the present invention provides a novel graphical user interface in which a graphical representation in a bitmap format includes a plurality of selectable bitmap portions and a selection of a plurality of the selectable bitmaps can bring up a drop-down box. The present invention also further achieves the above-noted and other objects by controlling a display in a drop-down box based on an operator selecting at least one designated group of the selectable bitmap portions.

To further achieve the above-noted and other objects, the present invention provides a novel graphical user interface which includes a bitmap image including a plurality of selectable bitmap portions. Further, at least one designated group of the plurality of selectable bitmap portions is corresponded to a single drop-down box. An indicator is provided to select one selectable bitmap portion from the plurality of selectable bitmap portions of the designated group. Further, a control process provides an indication in the drop-down box of the selected bitmap portion when the selected bitmap portion is part of the designated group. The control process also changes the indication in the drop-down box as a selected bitmap portion changes within the designated group.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
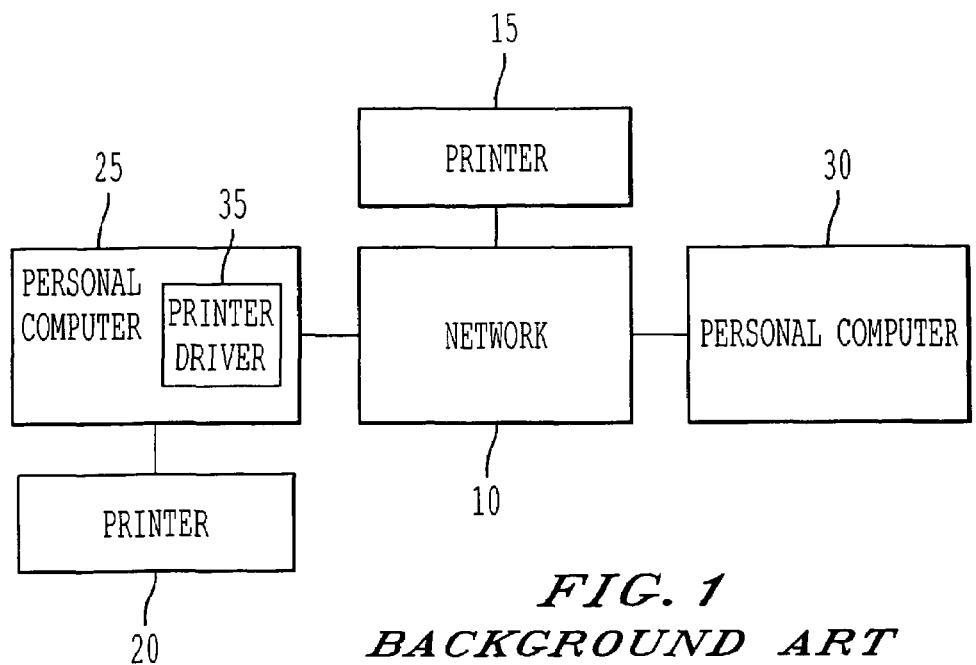
FIG. 1 shows a background system in which the present invention can be implemented.

Referring now to the drawings, wherein like reference numerals designate identical or corresponding parts throughout the several views, an operation of a graphical user interface of the present invention is now described in further detail.

Figure 2:
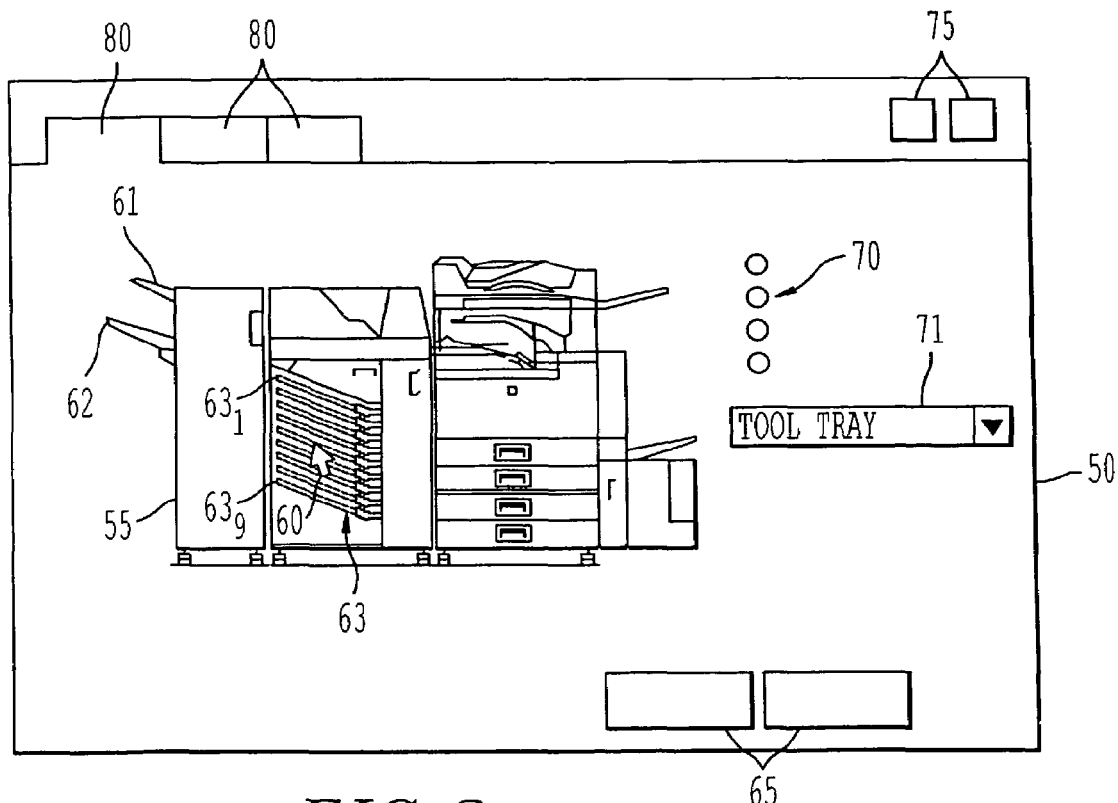
FIG. 2 shows a background graphical user interface screen.

As noted above, a drawback with a background art graphical user interface is that it may be difficult for an operator to properly select a certain control function, and to confirm selection of that control function, when several control functions are closely displayed together. As a specific example, and as noted above in the background art graphical user interface of FIG. 2, it may be difficult for an operator to select one of the mailbox trays $63_1$–$63_9$ from the mailbox tray area 63, and even after an operator selects one of the mailbox trays $63_1$–$63_9$ from the mailbox tray area 63 it may be difficult for the operator to confirm which mailbox tray was selected.

The present invention addresses such problems by treating certain selectable bitmap areas, i.e. a designated group of selectable bitmaps, differently if they contain a large number of selectable bitmap portions closely spaced together. One example of such an area is the mailbox tray area 63. In the mailbox tray area 63 nine different mailbox trays $63_1$–$63_9$ can be selected by an operator. The mailbox tray area 63 thus represents a large number of selectable bitmap portions, i.e., each mailbox tray $63_1$–$63_9$, within a small display area.

One feature in the present invention is that an area or a group of designated selectable bitmap portions, such as mailbox tray area 63, which contains a large number of selectable bitmap portions within a small display area, e.g. mailbox trays $63_1$–$63_9$, has a drop-down box corresponded thereto. In the present invention when the indicator 60 is passed over any portion of such an area as mailbox tray area 63 or designated group of mailbox trays $63_1$–$63_9$, the drop-box corresponded thereto is displayed on the graphical user interface screen and the mailbox tray currently being selected is highlighted in the drop-down box. Such features of the present invention are shown in further detail in FIGS. 3 and 4.

Figure 3:
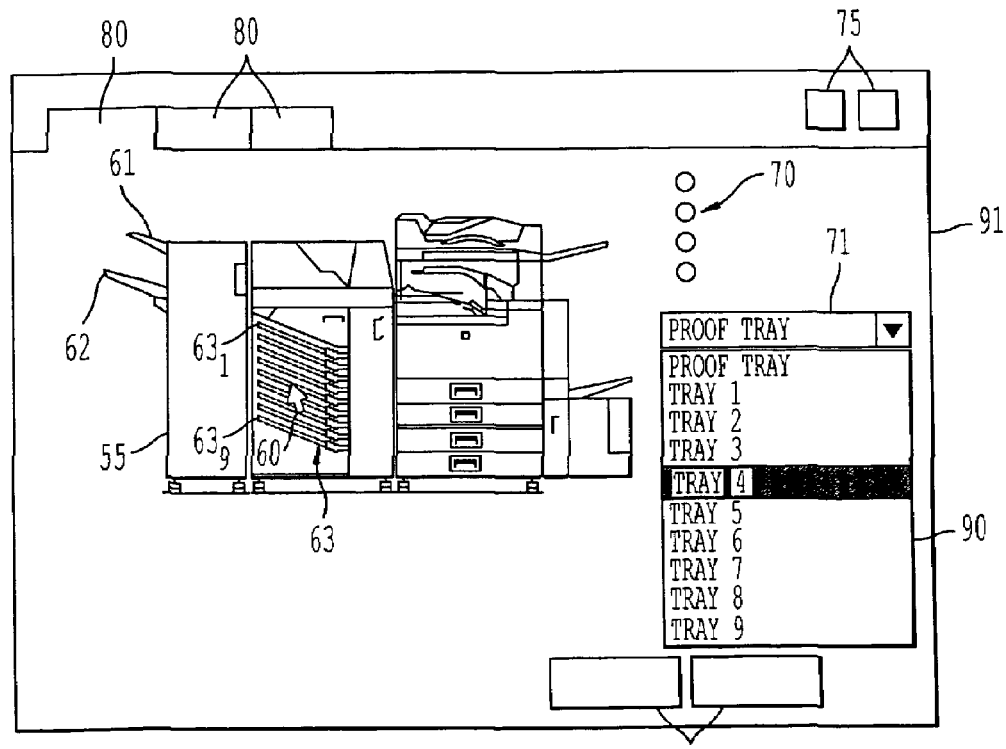
FIG. 3 shows an operation screen of a graphical user interface of the present invention.

FIG. 3 shows a screen 91 of the graphical user interface of the present invention. As shown in FIG. 3, a drop-down box 90 appears on the screen 91 of the graphical user interface. In the example shown in FIG. 3, the indicator 60 is indicating the mailbox tray $63_4$, and thus the drop-down box 90 has the "Tray 4" indication highlighted. In this instance, the operator can clearly see in the drop-down box 90 which tray is being pointed to by the indicator 60. If the operator desires to select the mailbox tray $63_4$ in this instance, the operator can, e.g., "click on" this selected mailbox tray with a mouse.

Further, the graphical user interface screen 91 as shown in FIG. 3 provides an operation such that as the indicator 60 moves along the different mailbox trays in the mailbox tray area 63, the highlighting in the drop-down box 90 changes commensurately. For example, if the operator moves the indicator 60 to point to the mailbox tray $63_3$, the drop-down box 90 will change to highlight the "Tray 3" indication.

With such an operation, the operator can again easily see which mailbox tray the indicator 60 is pointing to, which assists the operating in selecting the appropriate mailbox tray from the mailbox tray area 63. Further, the operator can easily see which mailbox tray is selected as the selected mailbox tray is highlighted in the drop-down box 90.

The drop-down box 90 can be displayed at different times. As one example discussed above in the background art, the drop-down box 90 can be displayed by clicking on the combo box 72. In this instance, the operator knows which areas of the graphical representation 55 have a drop-down box corresponded thereto. However, a drawback with this background approach is that there is no indication provided in the drop-down box of the selected mailbox tray being pointed to by the indicator 60 until the mailbox tray is selected. Such an operation does not therefore provide any aid in an operator selecting an appropriate mailbox tray.

As a feature of the present invention, the drop-down box 90 is displayed if the indicator 60 is in an area of the designated group of selectable bitmaps which are corresponded to the drop-down box 90. In this instance, the drop-down box 90 shown in FIG. 3 is displayed when the indicator 60 is in the mailbox tray area 63. Such an operation may be particularly helpful if a screen contains several designated groups of selectable bitmaps which are corresponded to drop-down boxes. If a screen includes several designated groups of selectable bitmaps corresponded to drop-down boxes, it may not be possible to constantly display all of the drop-down boxes. Obviously, variations can be made as long as the drop-down box is displayed while an operator is selecting one selectable bitmap portion from the designated group of selectable bitmaps.

As noted above, as one operation in the present invention of FIG. 3, the drop-down box 90 appears after the indicator 60 is passed over the mailbox tray area 63. In this instance, as a further feature in this invention the operator may change the selection of the mailbox tray in the mailbox tray area 63 by changing a selection within the drop-down box 90. One way to implement such an operation is to have one control on a mouse select maintaining the drop-box 90 to be displayed, for example by "clicking on" either a right-click or a left-click control on the mouse, and then allowing the operator to move the indicator 60 into the drop-down box 90 to change the selection of the selected mailbox tray within the drop-down box 90 by selecting the other control on the mouse. Such a further feature in the present invention may even further assist an operator in selecting an appropriate mailbox tray $63_3$.

Figure 4:
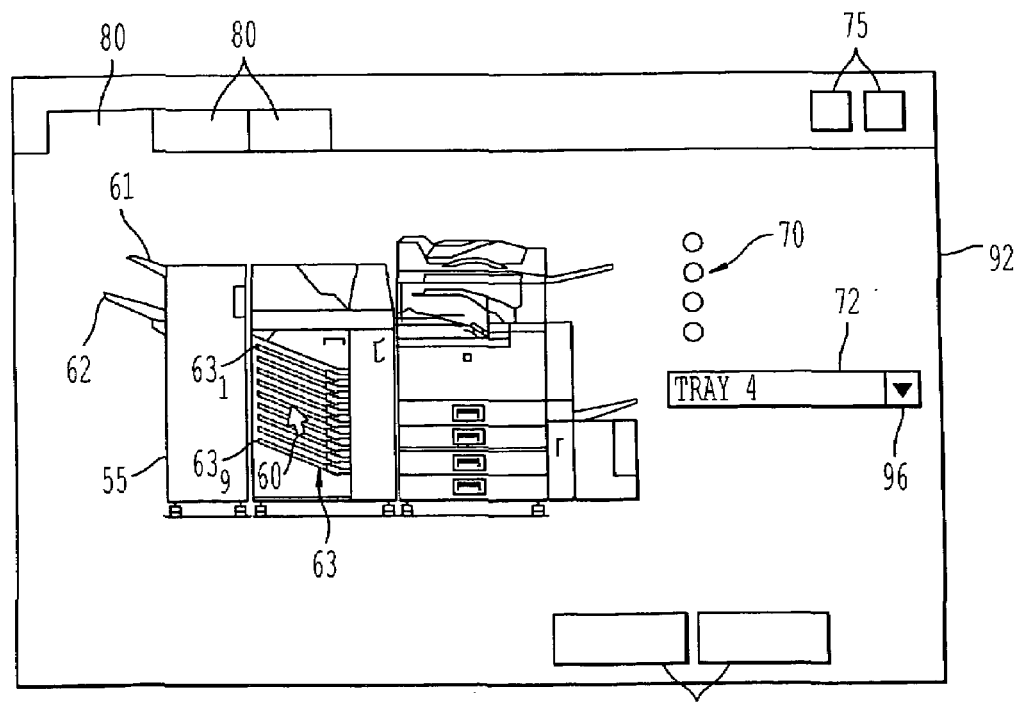
FIG. 4 shows a further operation screen of a graphical user interface of the present invention.

A further way to implement the system of the present invention is shown in FIG. 4. FIG. 4 shows a situation in which the indicator 60 is again pointing to the fourth mailbox tray, "Tray 4", in the mailbox tray area 63. In an operation of the graphical user interface as shown in FIG. 4, a screen 92 does not include the drop-down box 90 of "Tray 1" through "Tray 9" indicating each of the mailbox trays $63_1$–$63_9$ of FIG. 3, but instead provides only the combo box 72 providing an indication of the mailbox tray currently being pointed to by the indicator 60. The combo box 72 of the present invention differs from the combo box 71 shown in FIG. 2 as the display in the combo box 72 of the present invention will change based on a position of the indicator 60. That is, in such a feature of the present invention the contents in the combo box 72 change based on the position of the indicator 60 over the mailbox tray area 63. In the embodiment shown in FIG. 4, as the indicator 60 moves along the different mailbox trays in the mailbox tray area 63, the indication in the combo box 72 changes commensurately. As one concrete example, if in the situation shown in FIG. 4 the indicator 60 is moved to the third mailbox tray $63_3$ of the mailbox tray area 63, the combo box 72 would then display "Tray 3".

In the embodiment in FIG. 4, the operator may also change the selection of the mailbox tray by manipulation of the displayed mailbox tray in the combo box 72. In that instance, the operator may move the indicator 60 to the combo box 72, and more particular to the arrow 96 shown therein, and thereby change the indication of the selected mailbox tray in the combo box 72 by "clicking on" the arrow 96.

In these ways, with the graphical user interface of the present invention an operator can easily select, and confirm the selection of, one of the mailbox trays $63_1$–$63_9$ from the mailbox tray area 63.

The above-noted operation of the present invention has focused on the example of the different mailbox trays $63_1$–$63_9$ in the mailbox tray area 63. Clearly the present invention can be applied to any designated group of selectable bitmaps. The present invention is obviously most useful when a designated group of selectable bitmaps contains a large number of selectable bitmap portions in a small display area, although of course the present invention is not limited to this situation.

Figure 5:
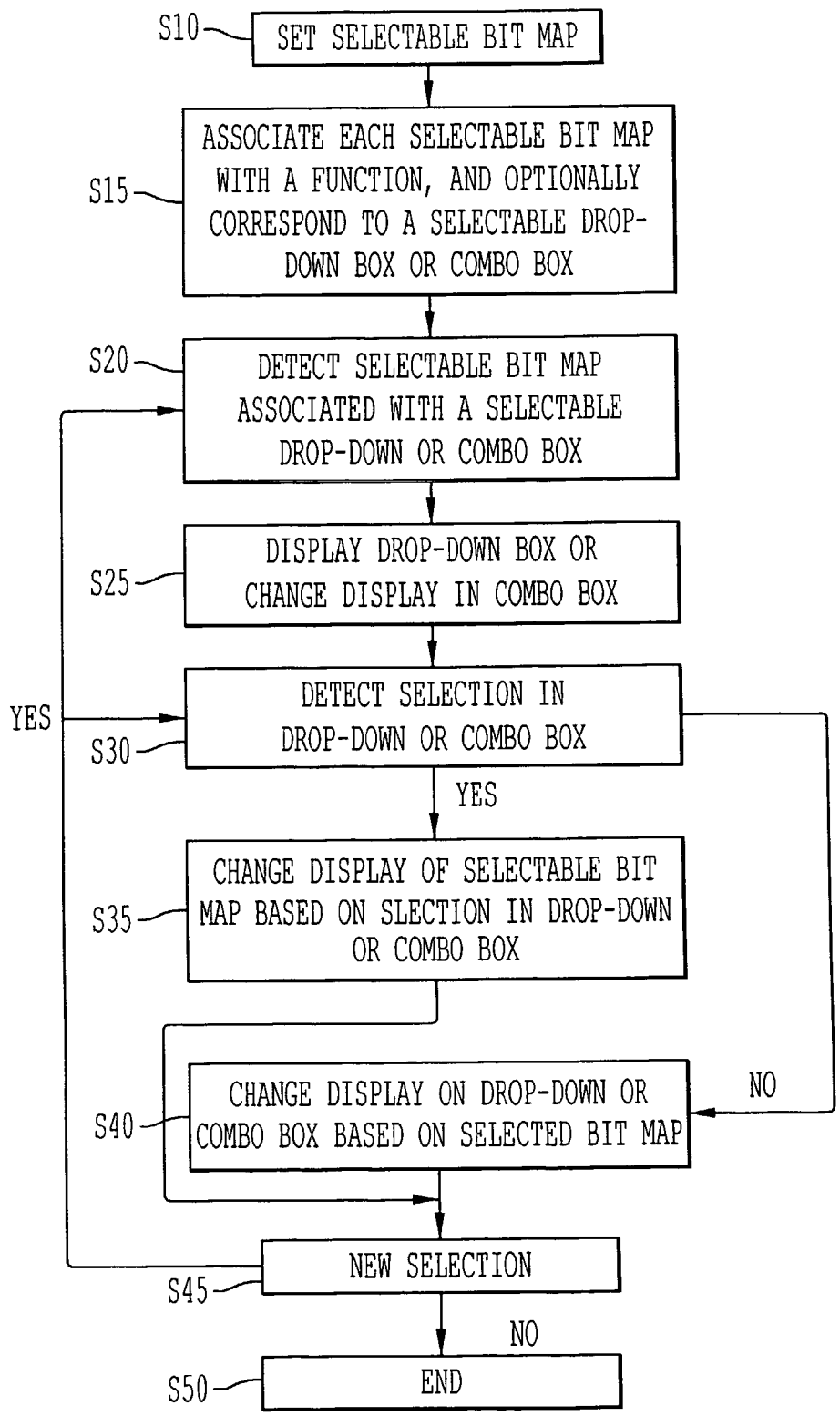
FIG. 5 shows a control operation executed in a graphical user interface of the present invention.

FIG. 5 shows factors considered in the development of a printer driver and the control processes executed in the present invention to achieve the operations as noted above. This control process is executed by a controller in a printer driver.

In FIG. 5, steps S10 and S15 are executed as essentially preliminary steps to an operation in the present invention. In step S10 selectable bitmaps are set. In the example noted above in FIGS. 3 and 4, the selectable bitmaps include the output trays 61, 62, and the mailbox trays $63_1$–$63_9$ in the mailbox tray area 63. Obviously the graphical user interface can include several more selectable bitmaps. The selectable bitmaps are bitmaps which an operator can point to with the indicator 60 and "click on" to select a function, and which may be highlighted, shaded, etc. when selected by an operator. This operation can be executed by an operator manipulating a mouse after pointing to the selectable bitmap with the indicator 60, although any other indicating operation could also be utilized.

Then, in step S15 each selectable bitmap is associated with a function, and optionally a selectable bitmap is corresponded to a function represented in a selectable drop-down box 90 as shown in FIG. 3, or a function represented in a selectable combo box 72 as shown in FIG. 4. In the example noted above in FIGS. 3 and 4, the selectable bitmaps 61 and 62 are directed to an output tray to be selected for a printed document, and the selectable bitmaps in the mailbox tray area 63 are directed to selecting a mailbox tray for a printed document. Further, in the examples noted above in FIGS. 3 and 4, the selectable bitmaps corresponding to the mailbox trays $63_1$–$63_9$ in mailbox tray area 63 are indicated as a designated group of selectable bitmap corresponded to functions in a selectable drop-down box, such as drop-down box 90 in FIG. 3, and a variable combo box 72 in FIG. 4. In the examples shown in FIGS. 3 and 4, the output trays 61 and 62 are not corresponded to a function in a drop-down box or variable combo box because the output trays 61 and 62 are spaced relatively far apart on the display and an operator can easily select one of the output trays 61 or 62 and view which output tray 61 and 62 has been selected by a shading, highlighting, etc. of the selected output tray. However, a selectable drop or combo box could be corresponded to a designated group of the output trays 61 and 62 if desired.

Step S20 through step S50 shown in FIG. 5 represent the control operations executed at a time of an operator utilizing the graphical user interface of the present invention.

One feature of the present invention, as noted above, is that the drop-down box 90 is displayed, or the contents in the combo box 72 are changed, after an operator moves the indicator 60 over an area which has been designated as corresponding to a drop-down or combo box. This operation is discussed further below. In FIG. 5 the references to the drop-down box also refers to the combo box 72 of FIG. 4, i.e. for this operation the variable combo box 72 is considered a type of drop-down box.

After step S15, the operation proceeds to step S20 in which the system detects whether a bitmap being selected is associated with a drop-down or combo box. In the examples shown in FIGS. 3 and 4, in a step S20 the control process of the graphical user interface detects whether the indicator 60 is indicating a selectable bitmap within the mailbox tray area 63, and also possibly associated with the selectable drop-down or combo box. Then, the operation proceeds to step S25 and then to step S30. Step S25 is also a step of displaying a drop-down box at the time that the selected bitmap is made in step S20, or of changing the display in the combo box based on the selection of the bitmap in step S20.

The operation executed in step S25 corresponds to the operation as noted above in which the drop-down box 90 of FIG. 3 is displayed after the indicator 60 is placed in the mailbox tray area 63, or the operation in which the contents of the combo box 72 of FIG. 4 are changed after the indicator 60 is placed in the mailbox tray area 63.

In step S30, it is then determined whether a selection is detected within the drop-down or combo box. As noted above, one feature in the present invention is that an operator can select a bitmap either by "clicking on" one of the corresponding displays in the drop-down box, or by changing one of the corresponding displays in the combo box. Step S30 determines whether one of the corresponding displays in the drop-down box is being "clicked on" or whether the combo box is being changed. If YES in step S30, the operation then proceeds to step S35 in which the display of the selectable bitmap is changed based on the selection in the drop-down or combo box. In this instance, if an operator does change a selection within the drop-down or combo box, the corresponding selectable bitmap is shaded, highlighted, etc. on the graphical representation 55. As one concrete example in the embodiments shown in FIGS. 3 and 4, if an operator changes one of the indication in one of the drop-down box 90 or combo box 72, for example to "Tray 4" in the embodiment shown in FIG. 3, then the mailbox tray $63_4$ is highlighted, shaded, etc. in the mailbox tray area 63 on the graphical representation 55.

If a selection is not made in the drop-down box in step S30, i.e NO in step S30, the operation proceeds to step S40 in which the displayed indication in the drop-down or combo box is changed based on the selected bitmap. In this instance, the operator is making a selection within the designated group of selectable bitmaps, for example within the bitmap tray area 63 shown in FIGS. 3 and 4 of the present specification, and in step S40 the drop-down or combo box display is changed to reflect the selected bitmap. In the examples in the respective embodiments of FIGS. 3 and 4, the "Tray 4" indication in the drop-down box 90 is highlighted and "Tray 4" is displayed in the combo box 72.

The operation then proceeds to step S45 in which it is determined whether a new selection is made, which selection again can be made either within the drop-down or combo boxes or the selectable bitmap areas. If NO in step S45 the operation ends in step S50.

If YES in step S45, the operation returns to either step S20 or step S30. The operation returns to step S20 if the new selection is made within the selectable bitmap area, and the operation returns to step S30 if the new selection is made within the drop-down or combo box.

With such an operation in the present invention as discussed in FIG. 5, an operator of the present invention can easily select a selectable bitmap portion within a designated group of selectable bitmaps which corresponds to a drop-down box. This provides the benefits as discussed above in detail.

This invention may be conveniently implemented using a conventional general purpose digital computer or microprocessor programmed according to the teachings of the present specification, as will be apparent to those skilled in the computer art. Appropriate software coding can readily be prepared by skilled programmers, for example in the language $C^{++}$, based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMS, and magneto-optical disks, ROMs. RAMs, EPROMS, EEPROMS, magnetic or optical cards, or any type of media suitable for storing electronic instructions.

Obviously, numerous additional modifications and variations of the present invention are possible in light of the above teachings. It is therefore to be understood that within the scope of the appended claims, the present invention may be practiced otherwise than as specifically described herein.

The invention claimed is:

1. A graphical user interface comprising:
    a graphical representation including a plurality of selectable portions, wherein at least one designated group of the plurality of selectable portions is corresponded to a single drop-down box, and each of the selectable portions of the designated group are simultaneously displayed in the single drop-down box;
    an indicator configured to select one selectable portion from the plurality of selectable portions of the designated group; and
    a control process configured to provide an indication in the drop-down box of the selected portion when the selected portion is part of the designated group, and configured to change the indication in the drop-down box as the selected portion changes within the designated group.

2. A graphical user interface according to claim 1, wherein the control process is further configured to constantly display each selectable portion from the designated group in the drop-down box and to provide the indication of the selected portion with a highlighting.

3. A graphical user interface according to claim 2, wherein the indicator is further configured to select the selected portion from both of the designated group and from the drop-down box.

4. A graphical user interface according to claim 1, wherein the control process is further configured to initially display the drop-down box only after the indicator is in an area of the designated group.

5. A graphical user interface according to claim 4, wherein the control process is further configured to constantly display each selectable portion from the designated group in the drop-down box and to provide the indication of the selected portion with a highlighting.

6. A graphical user interface according to claim 5, wherein the indicator is further configured to select the selected portion from both of the designated group and from the drop-down box.

7. A graphical user interface comprising:
image means including a plurality of selectable portions of a graphical representation, wherein at least one designated group of the plurality of selectable portions is corresponded to a single drop-down box, and each of the selectable portions of the designated group are simultaneously displayed in the single drop-down box;
indicator means for selecting one selectable portion from the plurality of selectable portions of the designated group; and
control means for providing an indication in the drop-down box of the selected portion when the selected portion is part of the designated group, and for changing the indication in the drop-down box as the selected portion changes within the designated group.

8. A graphical user interface according to claim 7, wherein the control means further constantly displays each selectable portion from the designated group in the drop-down box and provides the indication of the selected portion with a highlighting.

9. A graphical user interface according to claim 8, wherein the indicator means further selects the selected portion from both of the designated group and from the drop-down box.

10. A graphical user interface according to claim 7, wherein the control means further initially displays the drop-down box only after the indicator means is in an area of the designated group.

11. A graphical user interface according to claim 10, wherein the control means further constantly displays each selectable portion from the designated group in the drop-down box and provides the indication of the selected portion with a highlighting.

12. A graphical user interface according to claim 11, wherein the indicator means further selects the selected portion from both of the designated group and from the drop-down box.

13. A graphical user interfacing process for a graphical representation including a plurality of selectable portions, wherein at least one designated group of the plurality of selectable portions is corresponded to in a single drop-down box, and each of the selectable portions of the designated group are simultaneously displayed in the single drop-down box, comprising the steps of:
selecting one selectable portion from the plurality of selectable portions of the designated group;
providing an indication in the drop-down box of the selected portion when the selected portion is part of the designated group; and
changing the indication in the drop-down box as the selected portion changes within the designated group.

14. A graphical user interfacing process according to claim 13, wherein the providing step constantly displays each selectable portion from the designated group in the drop-down box and provides the indication of the selected portion with a highlighting.

15. A graphical user interfacing process according to claim 14, wherein the selecting step selects the selected portion from both of the designated group and from the drop-down box.

16. A graphical user interfacing process according to claim 13, wherein the providing step initially displays the drop-down box only after the selecting step provides an indicator in an area of the designated group.

17. A graphical user interfacing process according to claim 16, wherein the providing step constantly displays each selectable portion from the designated group in the drop-down box and provides the indication of the selected portion with a highlighting.

18. A graphical user interfacing process according to claim 17, wherein the selecting step selects the selected portion from both of the designated group and from the drop-down box.

19. A computer program product comprising:
a computer storage medium and a computer program code mechanism embedded in the computer storage medium for causing a computer to generate a graphical representation including a plurality of selectable portions, wherein at least one designated group of the plurality of selectable portions is corresponded to a single drop-down box, and each of the selectable portions of the designated group are simultaneously displayed in the single drop-down box, the computer program code mechanism comprising:
a first computer code configured to select one selectable portion from the plurality of selectable portions of the designated group; and
a second computer code configured to provide an indication in the drop-down box of the selected portion when the selected portion is part of the designated group, and configured to change the indication in the drop-down box as the selected portion changes within the designated group.

20. A computer program product according to claim 19, wherein the second computer code is further configured to constantly display each selectable portion from the designated group in the drop-down box and to provide the indication of the selected portion with a highlighting.

21. A computer program product according to claim 20, wherein the first computer code is further configured to select the selected portion from both of the designated group and from the drop-down box.

22. A computer program product according to claim 19, wherein the second computer code control is further configured to initially display the drop-down box only after the first computer code provides an indicator in an area of the designated group.

23. A computer program product according to claim 22, wherein the second computer code is further configured to constantly display each selectable portion from the designated group in the drop-down box and to provide the indication of the selected portion with a highlighting.

24. A computer program product according to claim 23, wherein the first computer code is further configured to select the selected portion from both of the designated group and from the drop-down box.

25. A graphical user interface comprising:
a graphical representation including a plurality of selectable portions, wherein at least one designated group of the plurality of selectable portions is corresponded to a single drop-down box;
an indicator configured to select one selectable portion from the plurality of selectable portions of the designated group, and wherein the indicator is further configured to select the selected portion from both of the designated group and from the drop-down box;

a control process configured to provide an indication in the drop-down box of the selected portion when the selected portion is part of the designated group, and configured to change the indication in the drop-down box as the selected portion changes within the designated group.

26. A graphical user interface according to claim 25, wherein the control process is further configured to constantly display each selectable portion from the designated group in the drop-down box and to provide the indication of the selected portion with a highlighting.

27. A graphical user interface according to claim 25, wherein the drop-downbox is a combo box which only displays the selected portion from the designated group as the indication of the selected portion.

28. A graphical user interface according to claim 25, wherein the control process is further configured to initially display the drop-down box only after the indicator is in an area of the designated group.

29. A graphical user interface according to claim 28, wherein the control process is further configured to constantly display each selectable portion from the designated group in the drop-down box and to provide the indication of the selected portion with a highlighting.

30. A graphical user interface according to claim 28, wherein the drop-down box is a combo box which only displays the selected portion from the designated group as the indication of the selected portion.

31. A graphical user interface comprising:
image means including a plurality of selectable portions of a graphical representation, wherein at least one designated group of the plurality of selectable portions is corresponded to a single drop-down box;
indicator means for selecting one selectable portion from the plurality of selectable portions of the designated group, and wherein the indicator means further selects the selected portion from both of the designated group and from the drop-down box; and
control means for providing an indication in the drop-down box of the selected portion when the selected portion is part of the designated group, and for changing the indication in the drop-down box as the selected portion changes within the designated group.

32. A graphical user interface according to claim 31, wherein the control means further constantly displays each selectable portion from the designated group in the drop-down box and provides the indication of the selected portion with a highlighting.

33. A graphical user interface according to claim 31, wherein the drop-down box is a combo box which only displays the selected portion from the designated group as the indication of the selected portion.

34. A graphical user interface according to claim 31, wherein the control means further initially displays the drop-down box only after the indicator means is in an area of the designated group.

35. A graphical user interface according to claim 34, wherein the control means further constantly displays each selectable portion from the designated group in the drop-down box and provides the indication of the selected portion with a highlighting.

36. A graphical user interface according to claim 34, wherein the drop-down box is a combo box which only displays the selected portion from the designated group as the indication of the selected portion.

37. A graphical user interfacing process for a graphical representation including a plurality of selectable portions, wherein at least one designated group of the plurality of selectable portions is corresponded to a single drop-down box, comprising the steps of:
selecting one selectable portion from the plurality of selectable portions of the designated group, and wherein the selecting selects the selected portion from both of the designated group and from the drop-down box;
providing an indication in the drop-down box of the selected portion when the selected portion is part of the designated group; and
changing the indication in the drop-down box as the selected portion changes within the designated group.

38. A graphical user interfacing process according to claim 37, wherein the providing step constantly displays each selectable portion from the designated group in the dropdown box and provides the indication of the selected portion with a highlighting.

39. A graphical user interfacing process according to claim 37, wherein the providing step only displays in a combo box as the drop-down box the selected portion from the designated group as the indication of the selected portion.

40. A graphical user interfacing process according to claim 37, wherein the providing step initially displays the drop-down box only after the selecting step provides an indicator in an area of the designated group.

41. A graphical user interfacing process according to claim 40, wherein the providing step constantly displays each selectable portion from the designated group in the dropdown box and provides the indication of the selected portion with a highlighting.

42. A graphical user interfacing process according to claim 40, wherein the providing step only displays in a combo box as the drop-down box the selected portion from the designated group as the indication of the selected portion.

43. A computer program product comprising:
a computer storage medium and a computer program code mechanism embedded in the computer storage medium for causing a computer to generate a graphical representation including a plurality of selectable portions, wherein at least one designated group of the plurality of selectable portions is corresponded to a single drop-down box, the computer program code mechanism comprising:
a first computer code configured to select one selectable portion from the plurality of selectable portions of the designated group, and wherein the first computer code is further configured to select the selected portion from both of the designated group and from the drop-down box; and
a second computer code configured to provide an indication in the drop-down box of the selected portion when the selected portion is part of the designated group, and configured to change the indication in the drop-down box as the selected portion changes within the designated group.

44. A computer program product according to claim 43, wherein the second computer code is further configured to constantly display each selectable portion from the designated group in the drop-down box and to provide the indication of the selected portion with a highlighting.

45. A computer program product according to claim 43, wherein the drop-down box is a combo box which only displays the selected portion from the designated group as the indication of the selected portion.

46. A computer program product according to claim 43, wherein the second computer code control is further configured to initially display the drop-down box only after the first computer code provides an indicator in an area of the designated group.

47. A computer program product according to claim 46, wherein the second computer code is further configured to constantly display each selectable portion from the designated group in the drop-down box and to provide the indication of the selected portion with a highlighting.

48. A computer program product according to claim 46, wherein the drop-down box is a combo box which only displays the selected portion from the designated group as the indication of the selected portion.

* * * * *